(12) United States Patent
Kaveetil et al.

(10) Patent No.: US 11,935,077 B2
(45) Date of Patent: Mar. 19, 2024

(54) OPERATIONAL PREDICTIVE SCORING OF COMPONENTS AND SERVICES OF AN INFORMATION TECHNOLOGY SYSTEM

(71) Applicant: Vunet Systems Private Limited, Bangalore (IN)

(72) Inventors: Jithesh Kaveetil, Bangalore (IN); Ashwin Kumar Ramachandran, Bangalore (IN); Balaji Srinivasan, Chennai (IN); Ganapathy Krishnamurthi, Chennai (IN)

(73) Assignee: VUNET SYSTEMS PRIVATE LIMITED, Bangalore (IN)

(*) Notice: Subject to any disclaimer, the term of this patent is extended or adjusted under 35 U.S.C. 154(b) by 382 days.

(21) Appl. No.: 17/083,682

(22) Filed: Oct. 29, 2020

(65) Prior Publication Data
US 2022/0108335 A1 Apr. 7, 2022

(30) Foreign Application Priority Data
Oct. 4, 2020 (IN) .............................. 202041043080

(51) Int. Cl.
*G06N 20/00* (2019.01)
*G06N 7/01* (2023.01)
(Continued)

(52) U.S. Cl.
CPC .......... *G06Q 30/0202* (2013.01); *G06N 7/01* (2023.01); *G06N 20/00* (2019.01); *G06Q 10/04* (2013.01)

(58) Field of Classification Search
CPC .......... G06Q 30/0201; G06Q 30/0202; G06Q 30/0203; G06Q 30/0204; G06Q 10/04; G06N 20/00; G06N 7/005
See application file for complete search history.

(56) References Cited

U.S. PATENT DOCUMENTS 7,321,882 B2  1/2008  Jaeger
8,214,308 B2  7/2012  Chu
(Continued)

FOREIGN PATENT DOCUMENTS

CN  109190982 A  * 1/2019
CN  111858230 A  * 10/2020 ............. G01K 1/022

OTHER PUBLICATIONS

Qin, Y. (2019). Faster multidimensional data queries on infrastructure monitoring systems (Order No. 27668184). Available from ProQuest Dissertations and Theses Professional. (2383542387). (Year: 2019).*

*Primary Examiner* — Sujay Koneru
*Assistant Examiner* — Nicholas D Bolen
(74) *Attorney, Agent, or Firm* — Ashok Tankha

(57) ABSTRACT

A system and method for real-time operational predictive scoring of components and services of an information technology system (ITS) for forecasting and assessing performance of the components of the ITS are provided. A data pipeline is configured to collect and store, in real-time, multiple time series signals corresponding to health, performance, and functionality of each of the components of the ITS. An operational predictive score (OPS) engine of a scoring module calculates an OPS for each of the time series signals. An OPS roll-up module of the scoring module calculates an OPS for each of the components and services in the ITS by aggregating the OPS for the individual time series signals. An alerting engine to notify operational issues and provide root cause analysis using OPS score decomposition. A visualization layer for OPS based analytics.

17 Claims, 9 Drawing Sheets

(51) Int. Cl.
  *G06Q 10/04* (2023.01)
  *G06Q 30/0202* (2023.01)

(56) References Cited

U.S. PATENT DOCUMENTS

| | | | |
|---|---|---|---|
| 8,327,335 B2 | 12/2012 | Noble et al. | |
| 9,396,037 B2 | 7/2016 | Morsi et al. | |
| 9,933,338 B2 | 4/2018 | Noda et al. | |
| 10,290,053 B2 | 5/2019 | Priess et al. | |
| 10,496,815 B1* | 12/2019 | Steiman | G06F 16/24575 |
| 10,608,911 B2 | 3/2020 | Nickolov et al. | |
| 10,671,443 B1* | 6/2020 | Ramachandran | G06F 16/903 |
| 11,258,825 B1* | 2/2022 | Yang | G06N 3/08 |
| 11,366,842 B1* | 6/2022 | Swaminathan | H04L 41/5009 |
| 2008/0082470 A1* | 4/2008 | Sobhani Tehrani | G06F 17/00 706/45 |
| 2010/0049494 A1* | 2/2010 | Radibratovic | G06Q 10/04 703/13 |
| 2014/0047064 A1* | 2/2014 | Maturana | G05B 23/0216 709/217 |
| 2014/0324862 A1 | 10/2014 | Bingham et al. | |
| 2015/0149393 A1* | 5/2015 | Hwang | G06N 20/00 706/12 |
| 2016/0186531 A1 | 6/2016 | Harkless et al. | |
| 2016/0342145 A1* | 11/2016 | Westcott | G06N 20/00 |
| 2017/0063901 A1* | 3/2017 | Muddu | G06N 7/005 |
| 2017/0111378 A1* | 4/2017 | Caffrey | G06N 5/025 |
| 2017/0339192 A1* | 11/2017 | Veeramachaneni | G06N 5/047 |
| 2018/0039914 A1 | 2/2018 | Menahem et al. | |
| 2018/0114234 A1* | 4/2018 | Fighel | G06Q 30/016 |
| 2019/0033848 A1 | 1/2019 | Cella et al. | |
| 2019/0173893 A1* | 6/2019 | Muddu | G06N 5/022 |
| 2019/0294998 A1* | 9/2019 | Kloepper | H04W 4/38 |
| 2019/0334787 A1* | 10/2019 | Kelly | H04L 43/20 |
| 2019/0354420 A1* | 11/2019 | Venkatesan | G06F 11/0751 |
| 2019/0394283 A1* | 12/2019 | Morrison | G06N 5/003 |
| 2020/0293704 A1* | 9/2020 | Viecelli | G06Q 10/0635 |
| 2021/0012238 A1* | 1/2021 | Gao | G06F 11/0793 |
| 2021/0365564 A1* | 11/2021 | Ewaida | G06F 11/3006 |
| 2022/0067295 A1* | 3/2022 | Alikiaamiri | G06N 7/02 |

* cited by examiner

OPERATIONAL PREDICTIVE SCORING OF COMPONENTS AND SERVICES OF AN INFORMATION TECHNOLOGY SYSTEM

CROSS-REFERENCE TO RELATED APPLICATIONS

This application claims priority to and the benefit of the non-provisional patent application titled "Operational Predictive Scoring of Components and Services of an Information Technology System", application number 202041043080, filed in the Indian Patent Office on Oct. 4, 2020. The specification of the above referenced patent application is incorporated herein by reference in its entirety.

FIELD OF THE INVENTION

The present invention, in general, relates to predictive performance monitoring and operational analytics of information technology systems, and more particularly, relates to operational predictive scoring of components and services of an information technology system in a standardized way in order to aid proactive monitoring and root cause analysis of problems faced by end-users.

BACKGROUND

As more and more services move to the digital medium, backend systems providing these services are becoming complex day by day. A good portion of revenues for a large number of enterprises come from their digital and online services, for example, E-commerce, Digital payments, etc. Enterprises want to ensure high-quality user experience when users interact with online services provided by the enterprise. Factors such as uninterrupted system availability, successful completion of transactions, and short turnaround times, etc., are all important in regard to user experience. Additionally, enterprises would like to keep all these factors at optimal levels. Furthermore, enterprises want to identify problems, for example, systems failures, components failures, bottlenecks, system overload, etc., well before users start complaining and take corrective actions as soon as possible. However, as the systems providing digital and online services get complex, and as user volumes and types of transactions increase, information technology operations teams are grappling with challenges in ensuring adequate service levels and good user experience. Furthermore, as the number of components in the information technology landscape increases, there are thousands of metrics that need to be monitored across components to understand how the systems are behaving.

A non-limiting example of an information technology system providing services to end users is, an internet banking system. The internet banking system comprises following components at the backend of a bank or a financial services company: a) routers, switches, and firewalls providing network connectivity and access controls, b) load balancers to handle a large volume of transactions in a scalable fashion, c) web servers to handle web service requests from users, d) application servers to host the application handling service requests, e) database nodes to handle user management and authentication, f) middlewares to interface with core banking systems, g) middlewares to interface with third party systems, interbank networks, etc., h) the main application hosting business logic for internet banking, i) core banking systems, j) short message service (SMS) gateway and authentication systems, and k) server and storage nodes to host applications and provide storage. Information technology (IT) operations teams would want to identify in advance, the potential problems that could affect users of the internet banking system. As soon as such problems arise, IT operations teams would want to identify the type of transactions impacted and pinpoint the components causing the problem. Once the components are identified, they would want to identify the important signals from these components that are possibly leading to the error conditions so that appropriate corrective actions can be taken.

Typically, the information technology (IT) operations team would be interested in the following: a) identify potential problems in the environment even before they start manifesting in a large way impacting user experience, b) proactively get notified about performance issues and failures at the service level, for example, transactions of certain type failing for internet banking users, c) ability to analyze operations data to identify the root cause of the problem and take corrective actions. As the complexity of digital applications and components grows, the above-mentioned tasks become increasingly complex, requiring operators to monitor the behavior of large number of software and hardware components in the environment, analyzing trends and patterns of hundreds of metrics to ascertain their state and the possibility of them causing the service deterioration.

In general, the information technology (IT) operations team handles the above requirement using various monitoring tools to continuously collect real-time data from these components. Typically, for each type of component of the system, there might be a specialized monitoring tool deployed that provides deep visibility into that particular component. For example, a database monitoring tool will provide visibility into the performance and functioning of the database by showing real-time charts and dashboards on various performance and health metrics. Similarly, an application performance monitoring (APM) tool will provide a source code level visibility to the application through real-time charts, function call sequences, requests processed, turnaround time, exceptions, etc. Recently, there have been attempts to realize unified visibility platforms that collect data from all heterogeneous systems in an IT environment and provide a single console view to all components.

However, all these methods require the operator to have skill sets to interpret large scale data from each component. Time-consuming data and trend analysis are required to understand the overall system functioning and the influence that each signal, metric and sub-system is having on the overall functioning of the system. The dependency on specific skill sets and personnel to handle and interpret data, results in the bottlenecks in decision making. In addition, an accurate predictive mechanism to identify potential problems that may be building up in the components or services in a complex information technology (IT) system is currently missing in existing tools. Therefore, from the perspective of the leadership team within and outside the IT department in an enterprise, there is a need for a system and a method that allows teams across the organization to interpret IT operational data in a meaningful way. Such a democratization of data would enable teams to make better sense of the data and take decisions based on the data. Furthermore, there is a need for a system and a method which will help in simplifying real-time monitoring and operational analytics of complex IT systems for the IT operations team.

Hence, there is a long felt need for a system and a method for real-time operational predictive scoring of components and services of an information technology system for forecasting and assessing performance of the components and the services of the information technology system.

SUMMARY OF THE INVENTION

This summary is provided to introduce a selection of concepts in a simplified form that are further disclosed in the detailed description of the invention. This summary is not intended to determine the scope of the claimed subject matter.

The system and the method disclosed herein address the above recited need for real-time operational predictive scoring of components and services of an information technology system for forecasting and assessing performance of the components and the services in the information technology system. A non-limiting example of components of the information technology system comprise one or more of: (a) routers, switches, and firewalls providing network connectivity and access controls, (b) load balancers to handle a large volume of transactions in a scalable fashion, (c) web servers to service web service requests from users, application servers to host application handling service requests, database nodes to handle user management and authentication, middlewares to interface with core computing systems, middlewares to interface with third party systems, and networks within a business enterprise, (d) a main application hosting business logic for a business enterprise, (e) core computing systems, (f) SMS gateway and Authentication systems, and (g) server and storage nodes to host applications and provide storage.

A data pipeline is configured to collect, in real-time, multiple signals comprising multiple metrics corresponding to one or more of health, performance, and functionality of each of the components of the information technology system. A data store is configured to receive a data stream comprising the collected signals, and store the received data stream as individual time series data. A scoring module comprises an operational predictive score (OPS) engine and an operational predictive score roll-up module. The operational predictive score (OPS) engine is configured to calculate an operational predictive score for each of the time series signals of the components of the information technology system corresponding to the individual time series data of each of the multiple time series signals. The OPS roll-up module is configured to aggregate the calculated operational predictive score of each of the time series signals of the components of the information technology system into an operational predictive score for each of the components of the information technology system. The data store is further configured to receive the operational predictive score of each of the time series signals of the components of the information technology system from the operational predictive score engine, and the operational predictive score for each of the components of the information technology system from the operational predictive score roll-up module.

The operational predictive score engine comprises a forecasting engine and a statistical scoring engine. The forecasting engine is configured to generate a probabilistic forecast for each of the time series signals of the components of the information technology system, using multiple customized machine learning models such as autoregressive Recurrent Neural Networks based forecasting models (RNN models). The statistical scoring engine is configured to calculate the operational predictive score for each of the time series signals of the components of the information technology system, using a statistical model on the probabilistic forecast from the forecasting engine for each of the time series signals of the components of the information technology system. The statistical scoring engine further comprises a statistical modelling engine configured to calculate a probability of the time series signals moving into an erroneous state in near future time, using a statistical model on the probabilistic forecast from the forecasting engine for each of the time series signals of the components of the information technology system. The probability calculated by the statistical modelling engine is used to derive the operational predictive score (OPS) for each of the time series signals of the components of the information technology system.

The operational predictive score (OPS) roll-up module further calculates operational predictive scores for the components and the services using the OPS for underlying time series signals. A non-limiting example would be calculating the OPS for an E-Commerce application by rolling up OPS of individual time series signals of the components like web server, application server, database and payment systems. The OPS for the components and the services is a rolled up ensemble of individual OPS for the underlying time series signals using the principles of joint probability.

The system further comprises a training module, an alerting engine, a graphical user interface, an operational predictive score (OPS) quality monitor module, and a root cause analysis module. The training module is configured to train the customized machine learning models, for example autoregressive recurrent neural network based forecasting models (RNN models), in a big data environment consisting of large volume of streaming data and thousands of time series signals. The training module is further configured to train a common machine learning model for a set of related time series signals. Furthermore, the training module is configured to be automatically triggered for retraining the customized machine learning models when the quality and an effectiveness of the operational predictive score (OPS) of any of the time series signals and the components fall below a pre-defined value, for example, optimal levels. The alerting engine is configured to monitor the value of the operational predictive scores for each of the time series signals and the components, and alert a user when the value falls below a set threshold. The graphical user interface is configured to provide a visualization of the operational predictive scores of each of the time series signals and the components to the user for facilitating one or more of real-time monitoring, historical trend analysis, and system improvement. The OPS quality monitor module is configured to monitor a quality and an effectiveness of the operational predictive score for each of the time series signals and the components. The root cause analysis module is configured to decompose the OPS of the components into a responsibility matrix when the operational predictive score of any component deteriorates during a user transaction journey within the services implemented using the components of the information technology system, to locate one or more of the components that are contributing to the deterioration.

The system further computes the operational predictive score (OPS) for the services implemented using the components of the information technology system (ITS). The system further computes the operational predictive score (OPS) for the user transaction journeys provided by the services implemented using the components of the ITS.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
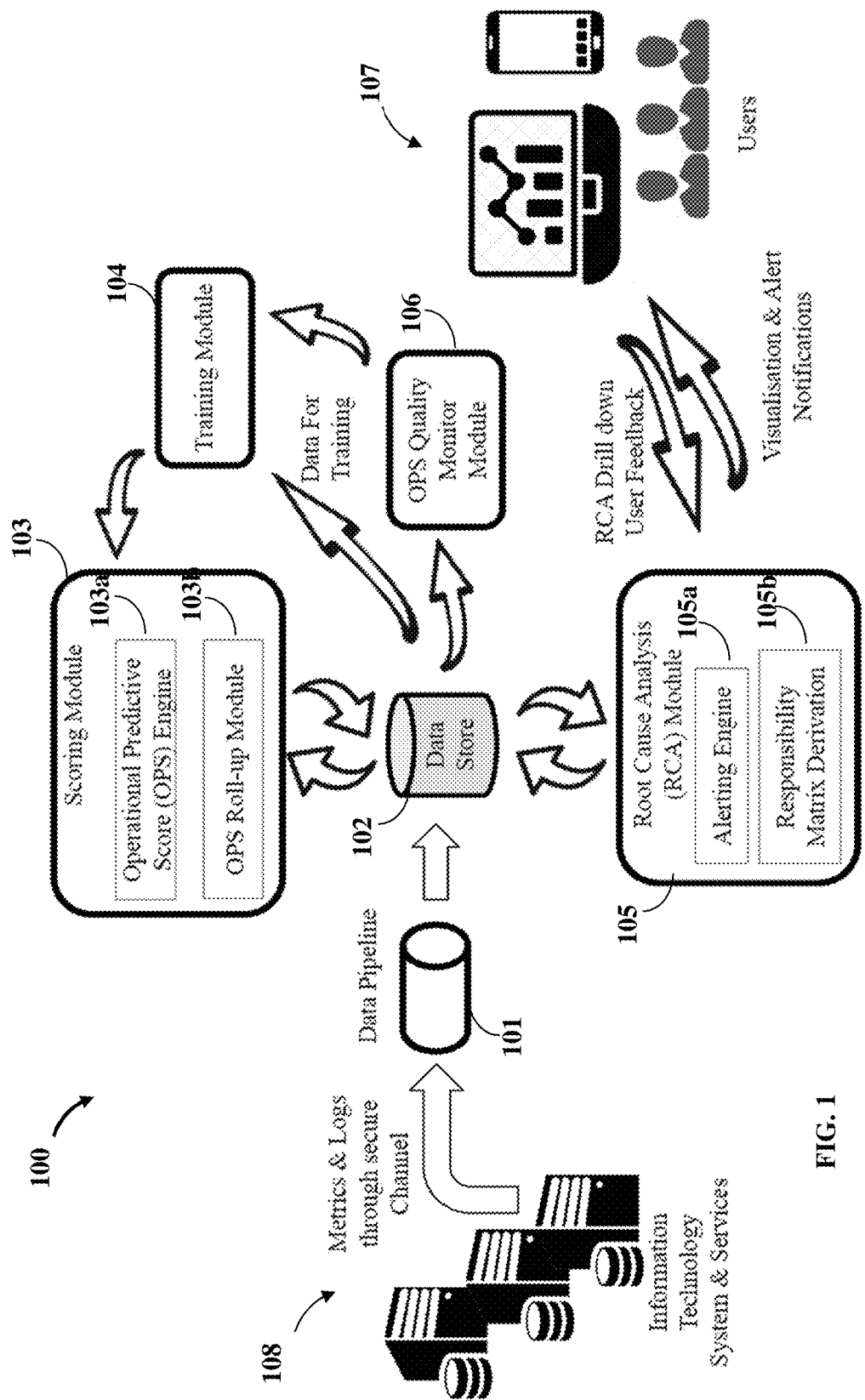
FIG. 1 exemplarily illustrates a computer implemented system for real-time operational predictive scoring of components and services of an information technology system for forecasting and assessing performance of the components and the services of the information technology system.

FIG. 1 exemplarily illustrates a computer implemented system 100 for real-time operational predictive scoring of components and services of an information technology system for forecasting and assessing performance of the components and the services of the information technology system. A non-limiting example of the components of the information technology system comprise one or more of: (a) routers, switches, and firewalls providing network connectivity and access controls, (b) load balancers to handle a large volume of transactions in a scalable fashion, (c) web servers to service web service requests from users, application servers to host application handling service requests, database nodes to handle user management and authentication, middlewares to interface with core computing systems, middlewares to interface with third party systems, and networks within a business enterprise, (d) a main application hosting business logic for a business enterprise, (e) core computing systems, (f) SMS gateway and Authentication systems, and (g) server and storage nodes to host applications and provide storage. As used herein, "services" refers to digital services and online services offered by an enterprise, for example, E-commerce, digital payments, etc., to users using a number of interconnected software and hardware components.

The system 100 is implemented as a software platform that can be deployed on-premise or can be deployed as software as a service (SaaS) on cloud. In an embodiment, the system 100 is implemented as a web based platform hosted on a server or a network of servers accessible via a network, for example, the internet, a wireless network, a mobile telecommunication network, etc. In another embodiment, the system 100 is implemented in a cloud computing environment. As used herein, "cloud computing environment" refers to a processing environment comprising configurable computing physical and logical resources, for example, networks, servers, storage, applications, services, etc., and data distributed over a network, for example, the internet. In another embodiment, the system 100 is configured as a cloud computing-based platform implemented as a service.

The system 100 comprises a data pipe line 101, a data store 102, a scoring module 103, a training module 104, a root cause analysis module 105, an operational predictive score (OPS) quality monitor module 106, and a graphical user interface 107. As shown in FIG. 1 an information technology system 108 comprises components for example, servers and hypervisors, network components, security devices, load balancers, web servers, application servers, business applications, middlewares, databases, queuing systems, third party application programming interfaces (APIs) and cloud services, etc. The components of the information technology system 108 from which telemetry is collected can be residing in an on-premise data center of the enterprise or in a cloud. In case that the components from which telemetry is being collected are in an on-premise data center, the system 100 can be co-located in the on-premise data center or the system 100 could be located in the cloud. In both cases, secure connection channels are used to stream health metrics, performance metrics, events and logs of the components to the system 100.

Each of the components in the information technology system 108 generates multiple time series signals in real-time. The data pipeline 101 is configured to collect, in real-time, the multiple time series signals comprising multiple metrics corresponding to one or more of health, performance, and functionality of each of the components of the information technology system 108. An agent-based or application programming interface (API) based scheme is used to collect and stream the time series signals comprising multiple metrics in real-time. The time series signals from the components go through a real-time streaming data pipeline 101 to undergo data extraction and transformation. The data pipeline 101 will add additional contextual information, extract information from logs, and remove unwanted fields. The data processed by the data pipeline 101 is stored in the data store 102.

Furthermore, the collection of data in real-time using the data pipeline 101 further comprises the components streaming the metrics, for example, logs, traffic flow information, metrics streams, etc. In an embodiment, the system 100 could periodically poll the components of the information technology system 108 to collect the metrics. In another embodiment, the information extracted from the components of the information technology system 108 might be in one or more of text format, message format, log format, etc. The data pipeline 101 extracts the required information from one or more of text format, message format, log format, etc., and transmits the extracted information as a time series data to the data store 102.

The data store 102 is configured to receive a data stream comprising the collected time series signals, and store the received data stream as individual time series data. The scoring module 103 comprises an operational predictive score engine 103a, and an operational predictive score (OPS) roll-up module 103b. The operational predictive score (OPS) engine 103a is configured to calculate an operational predictive score for each of the time series signals corresponding to health and performance metrics of the components of the information technology system 108. As used herein, "operational predictive score" refers to a value which provides a consistent and quantitative way to observe, compare, and improve overall operational performance of each of the components of the information technology system 108. For example, the OPS is a number between 0 and 10 with 0 representing the worst performance and 10 representing the best performance of the specific component and service. The OPS engine 103a reads data from the data store 102 at regular intervals, typically every few minutes, for example, 5 minutes, 10 minutes, etc. The frequency of data reading and OPS scoring can be controlled using a configuration option provided in the graphical user interface 107 of the system 100. In an embodiment, the data pipeline 100 is configured to directly stream the time series data of the metrics to the OPS engine 103a. The OPS engine 103a processes the streamed time series data and calculates the OPS for each of the time series signals at predetermined regular intervals. In both embodiments, the OPS engine 103a will use recent data corresponding to a context length from the time series data and use the same for OPS calculation.

Figure 2:
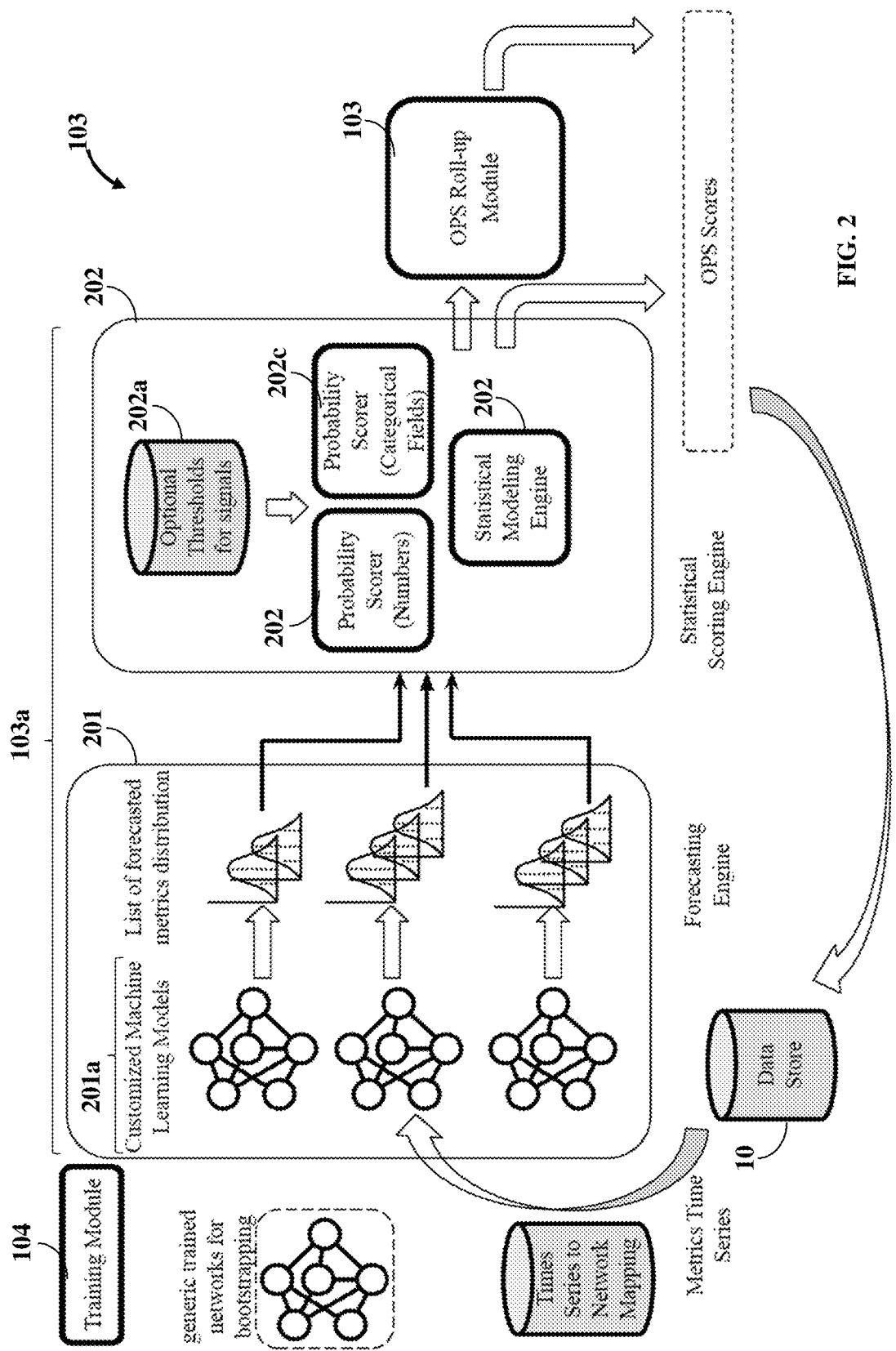
FIG. 2 exemplarily illustrates a scoring module.

The operational predictive score (OPS) engine 103a comprises a forecasting engine 201 and a statistical scoring engine 202, as exemplarily illustrated in FIG. 2. The forecasting engine 201 is configured to generate a probabilistic forecast for each of the time series signals of the components of the information technology system 108, using multiple customized machine learning models, for example, autoregressive Recurrent Neural Networks based forecasting models (RNN models) 201a. The training module 104 is configured to train the customized machine learning models 201a, as explained in detailed description of FIG. 5. The training module 104 is further configured to train a common machine learned model for a set of related time series signals. Furthermore, the training module 104 is configured to be automatically triggered for retraining the customized machine learning models 201a when a quality and an effectiveness of the forecasted values and the operational predictive score (OPS) of any of the time series signals and the components fall below a pre-defined value.

The operational predictive score (OPS) engine 103a collects time series data from the data store 102 at predetermined regular interval. One or more related time series data are grouped together to form datasets. Each dataset is fed to a customized machine learning model. The customized machine learning model uses, for example, a trained Recurrent Neural Network based forecasting model as a global model that has learned the behavior of each of the related time series data of the dataset. Furthermore, based on different choices of hyperparameters, multiple such trained machine learning models are generated for a dataset. Depending on the suitable accuracy criteria, the best model is selected and used for probabilistic forecasting of individual time series data of the dataset, as exemplarily illustrated in FIG. 2. Furthermore, the machine learning model has a provision to choose a suitable probability distribution depending upon the nature and type of time series data to obtain accurate probabilistic forecasts. For forecasting the time series data of an individual time series signal, the selected trained machine learning model uses the past time-series data of a fixed length i.e., context length and generates probabilistic forecasts, that are essentially the forecasted probability distributions, for each time point in the future window of predefined length i.e., prediction length.

Once the forecasting engine 201 of the operational predictive score (OPS) engine 103a has predicted probability distributions for the entire prediction length for a particular time series data of a time series signal, the statistical scoring engine 202 is configured to calculate the operational predictive score for each of the time series signals of the components of the information technology system 108, using a statistical model on the probabilistic forecast from the forecasting engine 201 for each of the time series signals of the components of the information technology system 108, as exemplarily illustrated in FIG. 2. The statistical scoring engine 202 further comprises a statistical modelling engine configured to calculate a probability of the time series signals moving into an erroneous state in near future time, using a statistical model on the probabilistic forecast from the forecasting engine 201 for each of the time series signals of the components of the information technology system 108. The probability calculated by the statistical modelling engine 202 is used to derive the operational predictive score (OPS) for each of the time series signals.

In a first embodiment, the statistical model uses the predicted probability distribution at the last time point of the prediction window and an optional critical threshold value (user-defined) to calculate the operational predictive score (OPS). This OPS serves as a measure of the performance of the time series signal for the future time window.

In a second embodiment, the statistical model uses the probabilistic forecasts at each time point of the prediction window. The statistical model calculates a probabilistic score at each point of the prediction length and the one with the least value is considered as a final operational predictive score (OPS) for the entire prediction window. The second embodiment of the statistical model is more robust and stricter than the first embodiment of the statistical model as it takes into account the forecasted distributions at all the points of the prediction window.

In a third embodiment, the statistical model uses Monte Carlo sampling technique for generating a very large number of samples from the forecasted distributions over the entire prediction length. In one sampling trial, one sample forecast is generated at each point of the prediction window by sampling from the corresponding forecasted distribution. In each trial, if the sampled value at one or more time points crosses the critical threshold, the trial is labelled as a failed trial. On the other hand, if the sampled value at all the time points remains below the critical threshold, the trial is labelled as a successful trial. The number of sampling trials should be large enough so that the generated sample space at any point correctly represents the population at that point. The probabilistic operational predictive score (OPS) is calculated using the number of successful trials and the total number of sampling trials. In the second embodiment, the probabilistic score at any point of the prediction window will be a higher value if the expectation of the forecasted distribution lies far from the critical threshold and will be lower if the expectation value lies close to the threshold for a given spread of the distribution. However, if the spread of the forecasted distribution is very small then it may lead to a rare but a possible situation where the probabilistic score becomes insensitive to the relative distance between expectation value of the forecasted distribution and the threshold value at a particular point of the prediction window. This problem does not arise in the third embodiment of the statistical model because in the third embodiment the OPS calculation does not explicitly involve the expectation value and spread of the forecasted distribution.

The operational predictive score (OPS) calculated for each of the time series signals for the components in the information technology system 108 are sent back to the data store 102. The OPS is calculated for each time series signal every few minutes and the OPS itself forms another time series data in the data store 102. Furthermore, the individual time series signal OPS are streamed to an operational predictive score roll-up module 103b. The operational predictive score roll-up module 103b is configured to aggregate the calculated operational predictive score of the time series signals of each of the components of the information technology system 108 into an operational predictive score for the components, as exemplarily illustrated in FIG. 3. The data store 102 is further configured to receive the operational predictive score (OPS) of each of the time series signals of the components of the information technology system 108 from the OPS engine 103a, and the OPS of each of the components of the information technology system 108 from the operational predictive score roll-up module 103b.

The root cause analysis module 105 is configured to decompose the operational predictive score of the components into a responsibility matrix derivation 105b when the operational predictive score deteriorates during a user transaction journey within the services implemented using the components of the information technology system 108, to locate one or more of the components that are contributing to the deterioration. The alerting engine 105a is configured to monitor a value of the operational predictive score (OPS) of the individual time series signals and the components, and alert a user when the value falls below a set threshold. The OPS quality monitor module 106 is configured to monitor a quality and an effectiveness of the operational predictive score (OPS) of the individual time series signals and the components, as exemplarily illustrated in FIG. 5. The graphical user interface 107 is configured to provide a visualization of the operational predictive scores of the individual time series signals and the components to the user for facilitating one or more of real-time monitoring, historical trend analysis, and system improvement. The operational predictive score (OPS) of the individual time series signals, the components, and the services are stored in the data store 102 and are made available to the users through a graphical user interface (GUI). The graphical user interface provides visualizations on user devices, for example, desktop and mobile devices.

The system 100 further computes the operational predictive score (OPS) for the services realized using the information technology system (ITS) 108. For example, the OPS is calculated for the internet banking service provided by a bank to its users by making use of the information technology system 108 consisting of network, network devices, servers, load balancers, web servers, application instances, middlewares, and third-party interfaces. The OPS is also calculated for user transaction journeys that represent the end to end flow of a particular type of business transaction that users do using the services provided by enterprises. For example, OPS is calculated for the end to end flow for fund transfer operation done by users using the internet banking service.

FIG. 2 exemplarily illustrates a scoring module 103. The scoring module 103 comprises a forecasting engine 201 consisting of an array of customized neural networks that generate probabilistic forecasts of individual time series signals fed into the network. The time series signals are fed into the network from a data store 102. For each time series signal, the pre-trained machine learning model to be used is also fed from the data store 102. The probabilistic forecasts for individual time series signals from the forecasting engine 201 is fed into a statistical scoring engine 202. The statistical scoring engine 202 calculates OPS for each of the time series signals using a statistical model on the probabilistic forecasts from the forecasting engine 201. The statistical scoring engine 202 further comprises a statistical modelling engine 202d that calculates the probability of the time series signals moving into erroneous states in future using a statistical model on the probabilistic forecasts from the forecasting engine 201. The statistical scoring engine 202 has a probability scorer 202b for the time series signals that have values in the numerical space and a probability scorer 202c for the time series signals that take categorical values. Furthermore, the statistical scoring engine 202 uses the predicted probability distribution at a last time point of a prediction window and an optional critical threshold value (user-defined) 202a to calculate the OPS for each of the time series signals. The OPS of the individual time series signals are fed into an OPS roll-up module 103b to calculate OPS for the components and the services.

Figure 3:
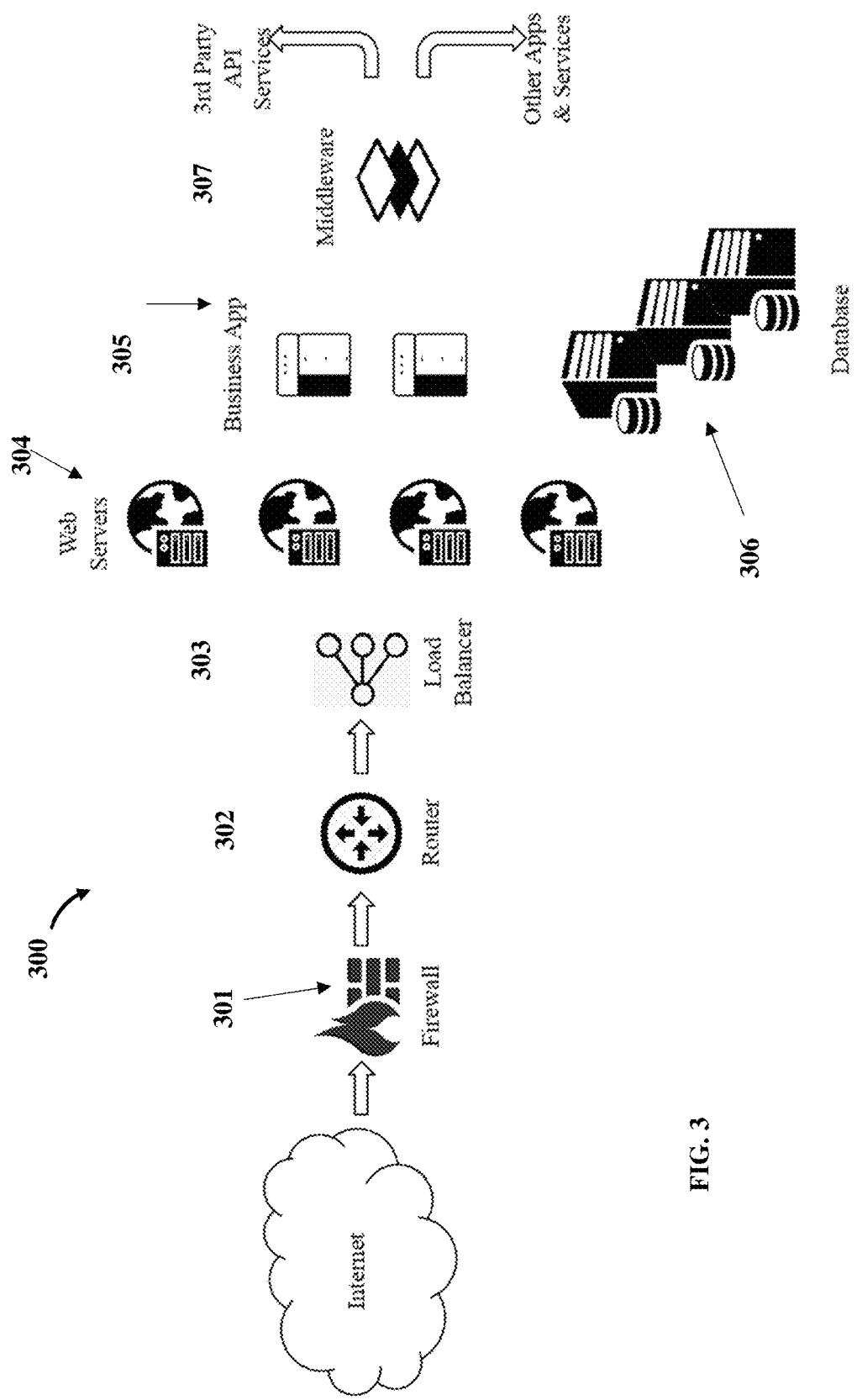
FIG. 3 exemplarily illustrates an implementation of an example information technology system in an environment corresponding to internet banking service provided by a financial institution.

FIG. 3 exemplarily illustrates an implementation of an example information technology system. This example is of an environment corresponding to internet banking service 300 provided by a financial institution. The internet banking service 300 is provided using a large number of software and hardware components comprising firewall 301, router 302, load balancer 303, web servers 304, application processes 305, database 306 and middleware 307. Users execute various business transactions like fund transfer, balance inquiry, bill payment, etc., using the internet banking service. Each of these business transactions from users involves a transaction journey through different components as shown in FIG. 3. Successful completion of the transaction and good turnaround time for completion is dependent on health, functioning, and performance of each and every component in the transaction journey. Each of the components in the internet banking service 300 generates multiple time series signals in real-time. The system 100 calculates operational predictive score (OPS) of each of the time series signals of the components of the internet banking service 300, as explained in the detailed description of FIG. 1.

Figure 4:
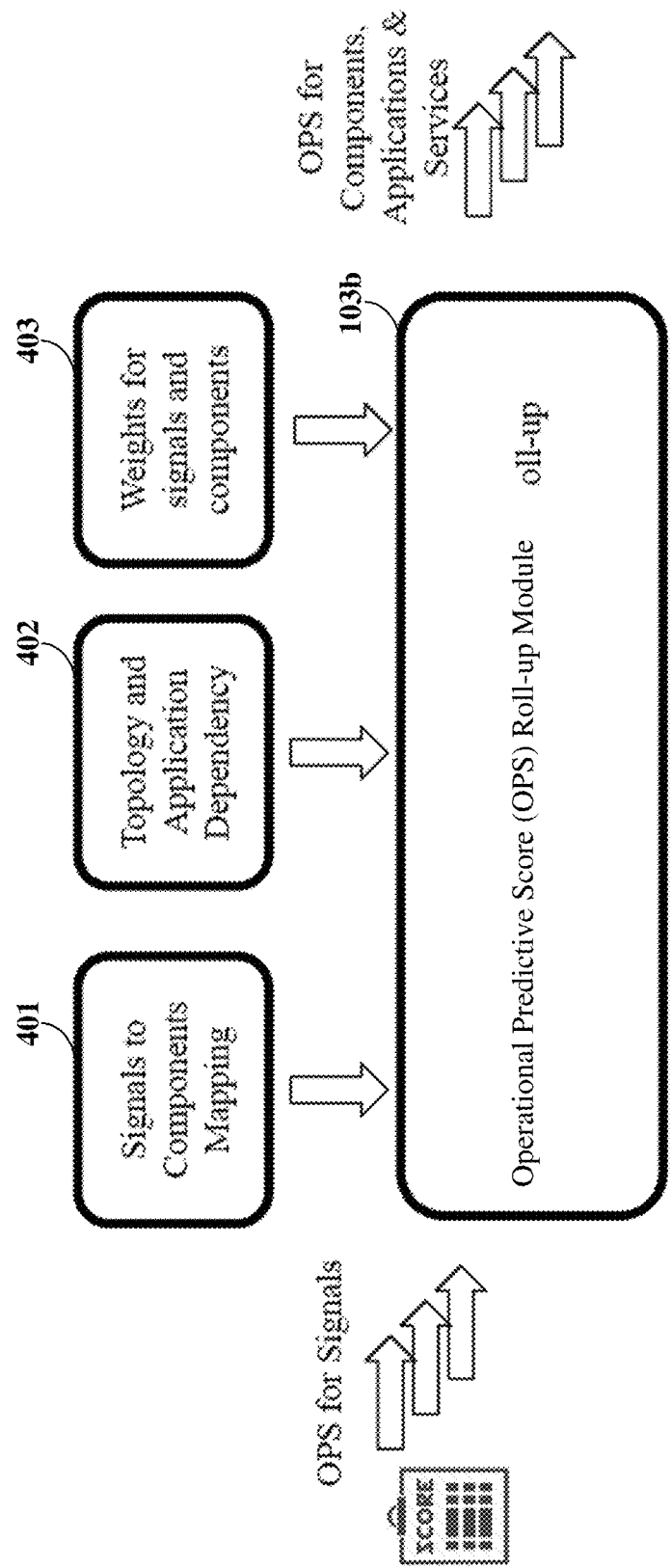
FIG. 4 exemplarily illustrates a component level operational predictive score (OPS) calculated by rolling up OPS for individual time series signals of a component.

FIG. 4 exemplarily illustrates a component level operational predictive score (OPS) calculated by rolling up OPS for individual time series signals of a component. The time series signals corresponding to the component are identified using the blocks shown in the top row in FIG. 4. This includes a mapping information table 401 that provides time series signals to components mapping and also a network topology and application map based mapping 402 of the time series signals to components. The impact of the individual time series signals on the rolled up OPS for the component is controlled through weight parameters 403 for each time series signal. Using this information, an operational predictive score (OPS) roll-up module 103b aggregates the OPS of the individual time series signals into an OPS for the components using a probabilistic technique.

The operational predictive score (OPS) roll-up module 103b aggregates the OPS of the individual time series signals into an OPS for the components using a mathematical model. For example, individual time series signals are used to first get a component level OPS. OPS from multiple components are rolled up to arrive at OPS for a software subsystem. OPS from multiple such sub systems are rolled up to arrive at OPS for an application. The OPS roll-up module 103b takes weights or priority associated with the individual time series signals or components while calculating the OPS of an application. For example, in the case of server health, central processing unit (CPU), and memory usage metrics will have a higher impact on the OPS of the application as compared to file system metrics. To incorporate this, the underlying statistical model uses the appropriate weights based on pre-configured priorities. The OPS scores of the components calculated by the OPS roll-up module 103b are sent to the data store 102 in the same fashion as OPS of the individual time series signals.

Figure 5:
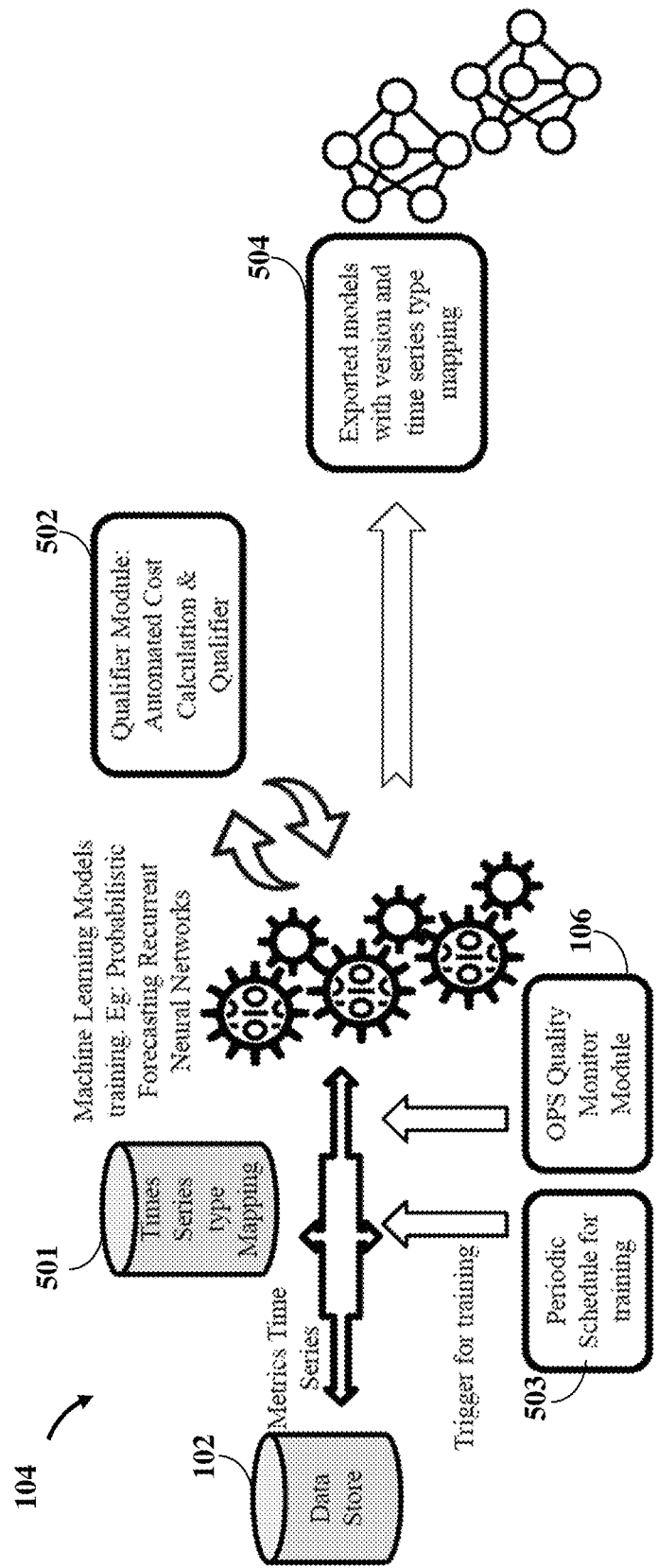
FIG. 5 exemplarily illustrates a training module for training customized machine learning models.

FIG. 5 exemplarily illustrates a training module 104 for training the customized machine learning models, for example Recurrent Neural Networks 201a. The training module 104 reads time series data for extended duration from the data store 102. The time series signals are mapped to related groups using the relationship maintained in a separate table 501 in the data store 102 shown as a separate block in FIG. 5. The time series signals are fed through a training process that trains the machine learning models 201a, for example, probabilistic forecasting recurrent neural networks. The training process is controlled through a cost and error calculation module (not shown) that arrives at the optimal model. Successive versions of models generated by the training module 104 over time is versioned using a version management module and the models are stored in the same. The whole training process runs as a periodic schedule 503 controlled by a scheduling module. The training is triggered at regular intervals, for example, once a week, so that the recent behavioural pattern of the time series data corresponding to a signal is incorporated into the training data for the machine learning model. The training process typically uses time series data for a long duration, for example, a few months, to ensure that all seasonal patterns and behavioural properties of the time series data are learned by the network. The training modules execute the training process in an automated manner with the Qualifier module 502 searching for optimal parameters for the network in an iterative fashion. For each signal, multiple models are created so that an ensemble mechanism of forecasting can be used. The created models are automatically exported as exported models 504 and made available to the operational predictive score (OPS) engine 103a. Apart from periodic scheduling of the training job to incorporate recently observed data, the system 100 monitors the quality and effectiveness of the OPS scoring. Furthermore, the OPS quality monitor module 106 can trigger retraining with additional inputs if OPS scoring quality goes below a predefined level.

Figure 6:
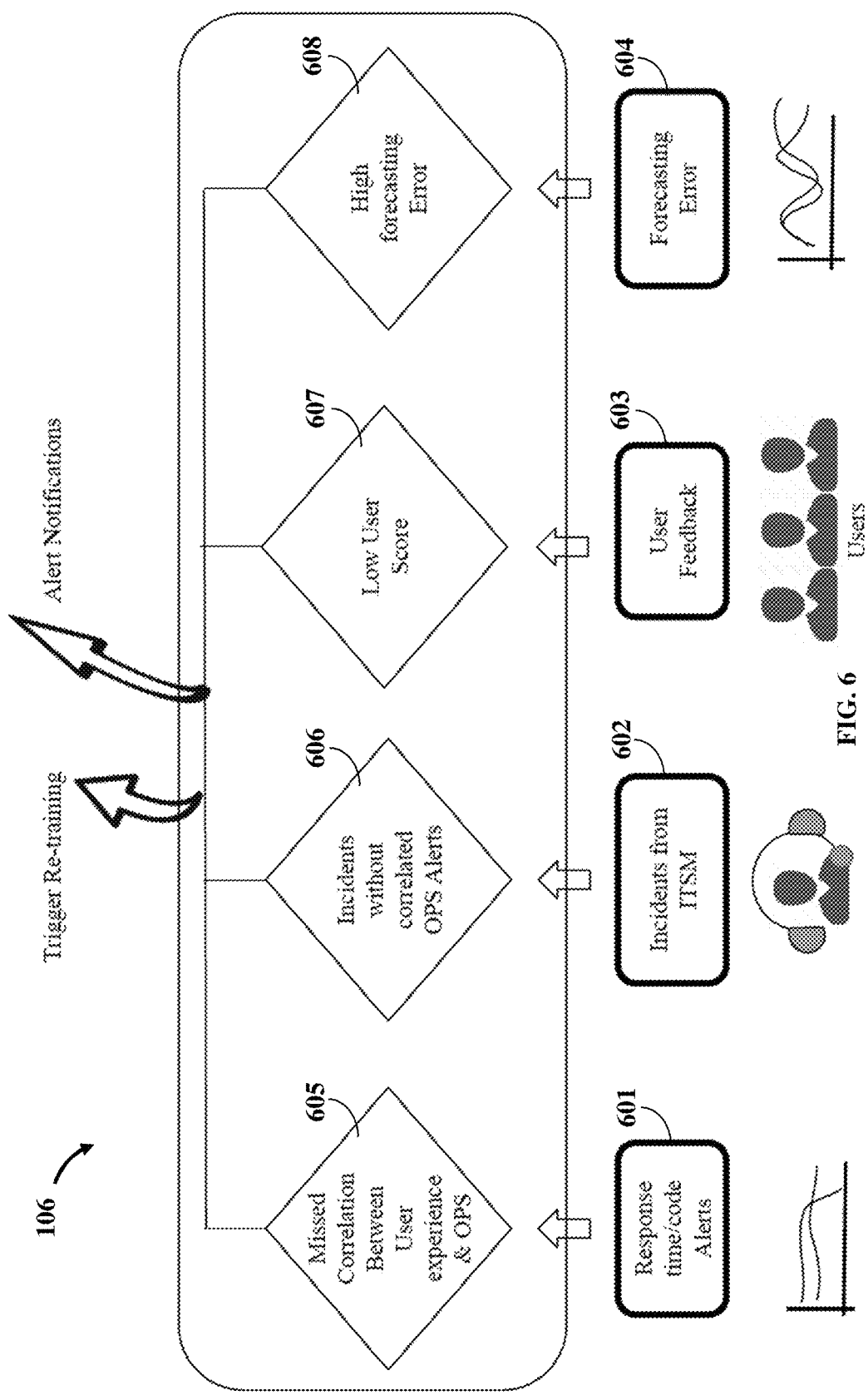
FIG. 6 exemplarily illustrates an operational predictive score (OPS) quality monitor module configured to monitor quality and effectiveness of OPS of individual time series signals and components.

FIG. 6 exemplarily illustrates an operational predictive score (OPS) quality monitor module 106 configured to monitor a quality and an effectiveness of OPS of individual time series signals and components. The bottom row in FIG. 6 shows runtime parameters 601-604 based on which quality and effectiveness of the OPS is monitored. The blocks in middle row show the corresponding threshold parameters 605-608 based on which the respective runtime parameters may trigger a retraining of machine learning models. The runtime parameters 601-604 include alerts 601 based on the quality of user experience measured using response codes received by users for their transactions and overall turn-around time for transactions. A measure of problems faced by users may additionally come in through information technology service management (ITSM) systems 602 where user complaints are logged. When either of these runtime parameters 601-604 deteriorate consistently, a retraining may be triggered. The bottom layer runtime parameters 601-604 include operator feedback 603 on quality of OPS and system calculated forecasting error module 604 to decide on retraining. The operational predictive score (OPS) quality monitor module 106 uses four separate measures to ascertain the quality and effectiveness of the OPS. First measure observed is the user experience measured using response code and response time as received by users. Essentially, user experience is monitored based on the outcome of a business transaction by the user and the turnaround time. The user experience as measured above is expected to have a direct correlation with the OPS for the service. For example, if the operational predictive score (OPS) for a service goes down, it indicates that the service components are going to face errors finally resulting in deterioration in percentage of successful transactions and an increase in response time. Repeated cases of user experience deterioration without corresponding indication from OPS would point to a quality issue in OPS scoring. Similarly, a user reported problem or incident from ticketing systems without corresponding indication from OPS would also point to quality issues in OPS scoring.

The operational predictive score (OPS) quality monitor module 106 is configured to continuously compare the forecasted values for the time series signals and actual values observed. If they diverge consistently, it would point to the poor performance of the forecasting module. Apart from this, users can give direct feedback on the quality of operational predictive score (OPS) based on their observations and domain knowledge. Based on the above observations, the OPS quality monitor module 106 will automatically identify the quality and effectiveness of OPS scoring. This improves the overall quality of the scoring system tremendously. Apart from triggering retraining, the OPS quality monitor module 106 will generate alert notifications to operators to notify about the deterioration in quality of the OPS. The notifications will enable operators to analyse and fine-tune the system 100.

Figure 7:
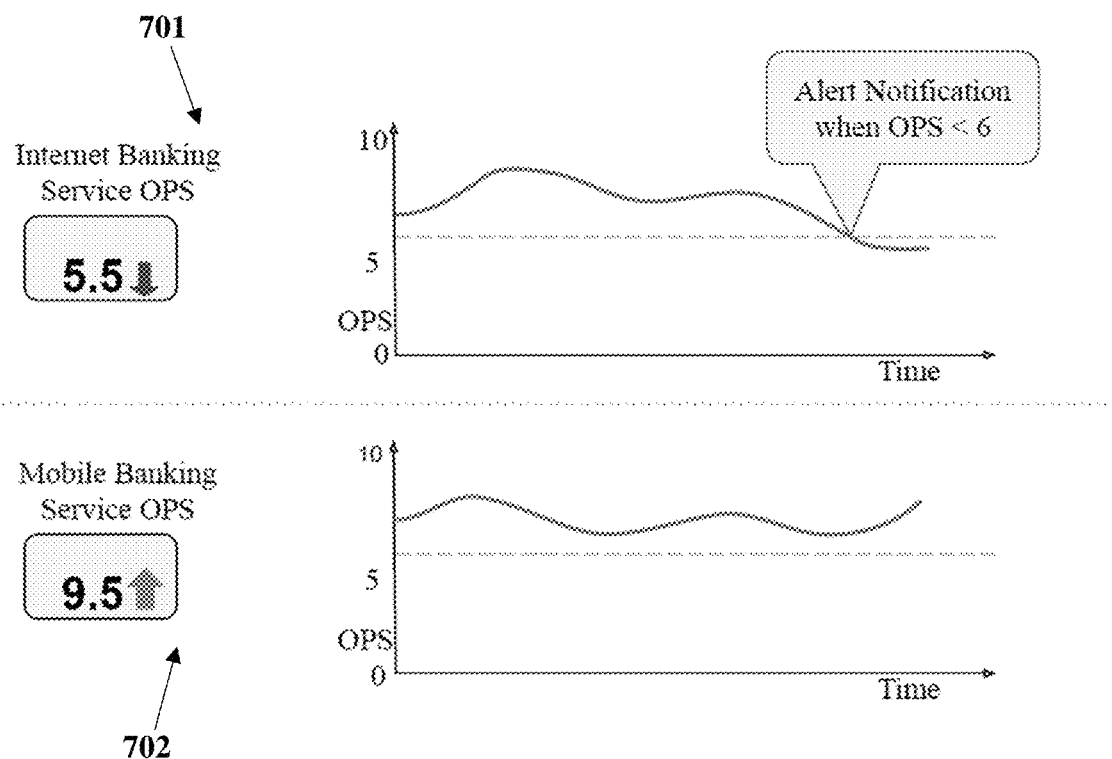
FIG. 7 exemplarily illustrates a representation of visualizations and alert trigger points of two example services, namely an internet banking service operational predictive score (OPS) and a mobile banking service OPS.

FIG. 7 exemplarily illustrates a representation of visualizations and alert trigger points of two example services, namely an internet banking service operational predictive score (OPS) 701 and a mobile banking service OPS 702. The visualisations in the figure include the trend line charts showing variation of OPS over time for respective services along with another visualisation displaying the current value of OPS for the services. The trend chart shows the scenario where the OPS for one of the services goes below the optimal level resulting in an alert notification getting triggered. Operators would be making use of such dashboards containing such visualisations to monitor and proactively act on operational level issues. A common use of the visualizations by the information technology operators is to do debugging and root cause analysis (RCA) when services or components fail or are not functioning as expected. As shown in FIG. 7, the alerting engine 105a is configured to send an alert notification when the OPS value falls below a configured or auto calculated threshold.

Figure 8:
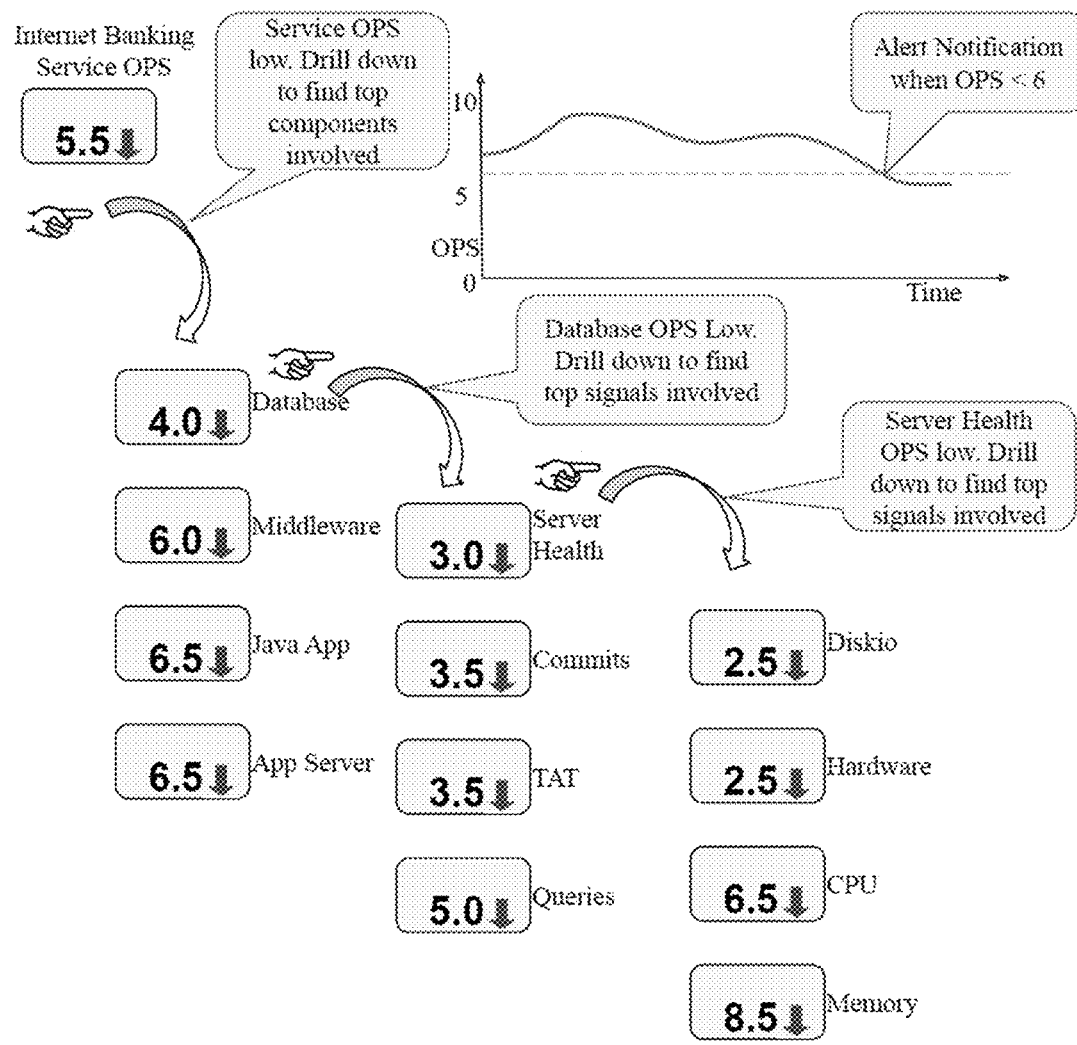
FIG. 8 exemplarily illustrates a scenario where operators makes use of the operational predictive score decomposition based root cause analysis to identify and correct issues related to quality of services provided by a service realized using a complex information technology system.

FIG. 8 exemplarily illustrates a scenario where operators makes use of the operational predictive score (OPS) decomposition based root cause analysis (RCA) to identify and correct issues related to quality of services provided by a service realized using a complex information technology system. FIG. 8 illustrates the real-time dashboard view from a software platform. The trend charts of OPS provide a real-time view of the operational performance of the example internet banking service. When OPS falls below an optimal level, operators use the interactive charts to decompose internet banking service OPS into OPS of individual components. Once the components contributing substantially to service OPS deterioration are identified, operators decompose the respective component OPS to underlying time series signals. FIG. 8 exemplarily illustrates a scenario where the quality of services provided by an internet banking service goes down considerably. The operational predictive score (OPS) for internet banking service will reflect this in the live visualizations. Operators can then drill down further by making use of the responsibility matrix to locate the components within the internet banking service that are contributing to the fall in the score. This operation can be repeated to further levels as shown in the diagram to locate the individual systems and time series signals causing the problem. The responsibility matrix derivation module provides this functionality of deconstructing an aggregate score for the internet banking service into individual contributing scores.

Figure 9:
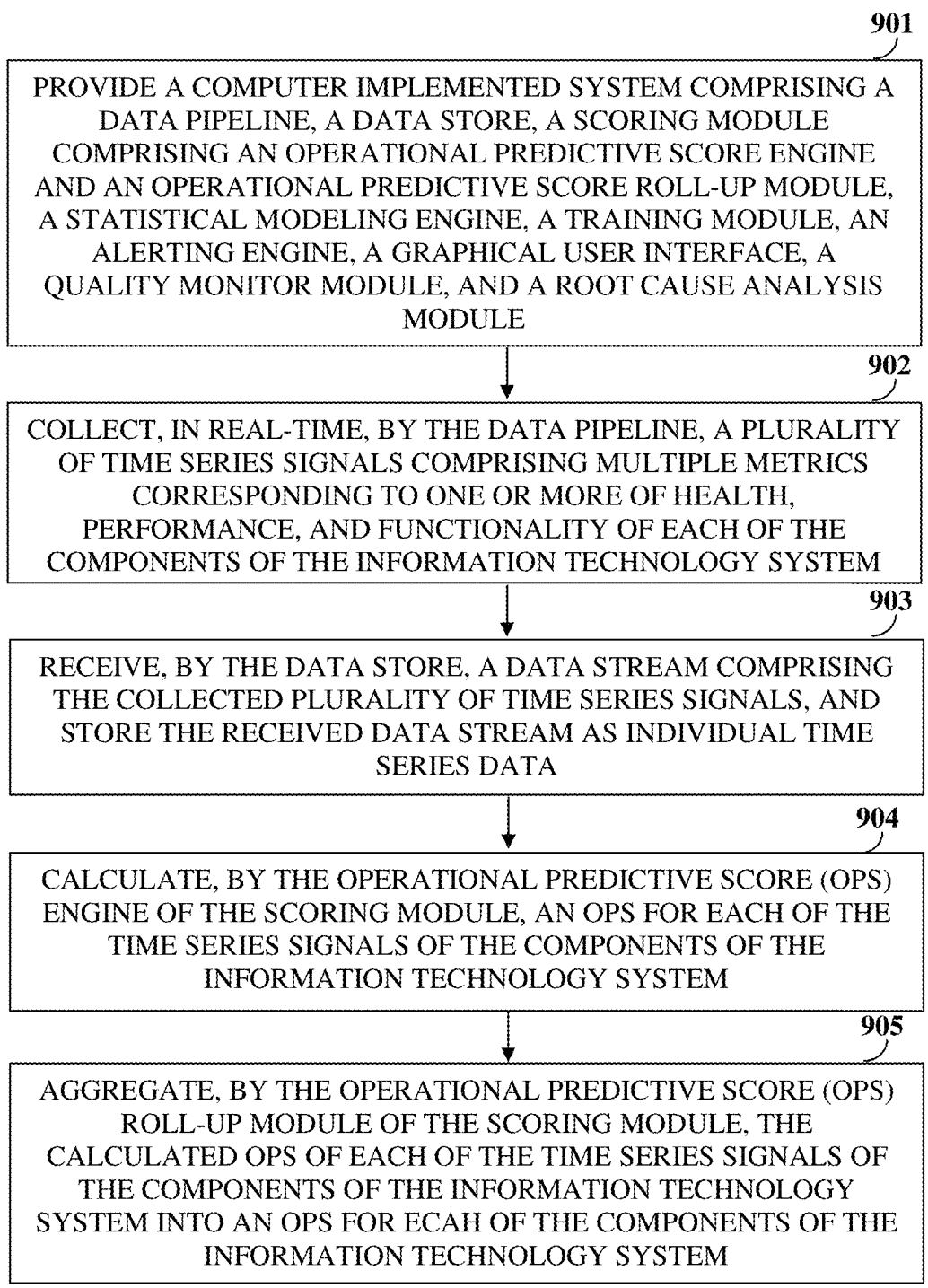
FIG. 9 exemplarily illustrates a computer implemented method for real-time operational predictive scoring of components and services of an information technology system for forecasting and assessing performance of the components and the services of the information technology system.

FIG. 9 exemplarily illustrates a computer implemented method 900 for real-time operational predictive scoring of components and services of an information technology system for forecasting and assessing performance of the components and the services of the information technology system. The method disclosed herein provides 901 a computer implemented system 100 comprising a data pipeline 101, a data store 102, a scoring module 103 comprising (a) an operational predictive score engine 103a comprising a forecasting engine 201 and a statistical scoring engine 202, and (b) an operational predictive score (OPS) roll-up module 103b, a statistical modelling engine 202d within the statistical scoring engine 202, a training module 104, a root cause analysis module 105 comprising an alerting engine 105a and a responsibility matrix derivation 105b, a graphical user interface 107, and an OPS quality monitor module 106. The data pipeline 101 collects 902, in real-time, multiple time series signals comprising multiple metrics corresponding to one or more of health, performance, and functionality of each of the components of the information technology system. The data store 102 receives 903 a data stream comprising the collected plurality of time series signals, and stores the received data stream as individual time series data. The operational predictive score engine 103a of the scoring module 103 calculates 904 an operational predictive score (OPS) for each of the time series signals of the components of the information technology system. The OPS roll-up module 103b of the scoring module 103 aggregates 905 the calculated OPS of each of the time series signals of the components of the information technology system into an OPS for each of the components of the information technology system.

The foregoing examples have been provided merely for explanation and are in no way to be construed as limiting of the system 100 and the method disclosed herein. While the system 100 and the method have been described with reference to various embodiments, it is understood that the words, which have been used herein, are words of description and illustration, rather than words of limitation. Furthermore, although the system 100 and the method have been described herein with reference to particular means, materials, and embodiments, the system 100 and the method are not intended to be limited to the particulars disclosed herein; rather, the system 100 and the method extend to all functionally equivalent structures, methods and uses, such as are within the scope of the appended claims. While multiple embodiments are disclosed, it will be understood by those skilled in the art, having the benefit of the teachings of this specification, that the system 100 and the method disclosed herein are capable of modifications and other embodiments may be effected and changes may be made thereto, without departing from the scope of the system 100 and the method disclosed herein.

We claim:

1. A computer implemented system for real-time operational predictive scoring of components and services of an information technology system for forecasting and assessing performance of said components of said information technology system, the computer implemented system comprising:

a non-transitory, computer-readable storage medium configured to store computer program instructions and data defined by said computer implemented system;

at least one processor communicatively coupled to said non-transitory, computer-readable storage medium, said at least one processor configured to execute the defined computer program instructions for performing a method comprising:

collecting, in real-time, a plurality of time series signals comprising multiple metrics corresponding to one or more of health, performance, and functionality of each of said components of said information technology system;

receiving a data stream comprising said collected plurality of time series signals, and storing said received data stream as individual time series data;

generating a probabilistic forecast for each of said time series signals of said components of said information technology system collected in real-time, using a plurality of customized machine learning models comprising autoregressive Recurrent Neural Network based forecasting models, wherein said autoregressive Recurrent Neural Network based forecasting models serve as global models for multiple related time series signals and use past time series data of a fixed length and generate time series data in terms of probability distributions for a future time window of a prediction length;

training said customized machine learning models as said global models for said multiple related time series signals based on a periodic schedule, wherein said training process is controlled through a cost and error calculation;

calculating an operational predictive score for each of said time series signals of said components of said information technology system as an indicator of performance of said each of said time series signals of said components of said information technology system in a near future, corresponding to said individual time series data of each of said plurality of time series signals, wherein said calculation comprises using a statistical model on said probabilistic forecast for each of said time series signals of said components of said information technology system;

aggregating said calculated operational predictive score of each of said time series signals of said components of said information technology system into an operational predictive score for each of said components of said information technology system as an indicator of performance of said components in said near future; and automatically triggering retraining of said customized machine learning models based on monitoring a quality and an effectiveness of said operational predictive score of each of said time series signals and said components, wherein said monitoring said quality and said effectiveness of said operational predictive score of each of said time series signals and said components is based on factors comprising:
  missed correlation between user experience and said operational predictive score for each of said time series signals of said components of said information technology system;
  incidents without correlated operational predictive score alerts;
  low user score; and
  high forecasting error.

2. The system of claim 1, further comprising calculating a probability of said plurality of time series signals moving into an erroneous state in near future time, using said statistical model on said probabilistic forecast for each of said time series signals of said components of said information technology system, wherein said calculated probability is used to derive said operational predictive score for each of said time series signals of said components of said information technology system.

3. The system of claim 1, further comprising training a common machine learned model for a set of related time series signals.

4. The system of claim 1, further comprising monitoring a value of said operational predictive score for each of said time series signals of said components of said information technology system and a value of said operational predictive score for each of said components of said information technology system, and alerting a user when said value falls below a set threshold.

5. The system of claim 1, further comprising a graphical user interface configured to provide a visualization of said operational predictive scores of each of said time series signals and said components to said user, for facilitating one or more of real-time monitoring, historical trend analysis, and system improvement.

6. The system of claim 1, further comprising calculating an operational predictive score for said services implemented using said components of said information technology system.

7. The system of claim 6, further comprising calculating an operational predictive score for said components in said services implemented using said components of said information technology system.

8. The system of claim 7, further comprising decomposing said operational predictive score for any of said components of said information technology system into a responsibility matrix when said operational predictive score for any of said components of said information technology system deteriorates during a user transaction journey within said services implemented using said components of said information technology system, to locate one or more of said components that are contributing to said deterioration.

9. A computer implemented method for real-time operational predictive scoring of components and services of an information technology system for forecasting and assessing performance of said components of said information technology system, said method employing a computer implemented system executable by at least one processor configured to execute computer program instructions for performing said method comprising:
  collecting, in real-time, a plurality of time series signals comprising multiple metrics corresponding to one or more of health, performance, and functionality of each of said components of said information technology system;
  receiving a data stream comprising said collected plurality of time series signals, and storing said received data stream as individual time series data;
  generating a probabilistic forecast for each of said time series signals of said components of said information technology system collected in real-time, using a plurality of customized machine learning models comprising autoregressive Recurrent Neural Network based forecasting models, wherein said autoregressive Recurrent Neural Network based forecasting models serve as global models for multiple related time series signals and use past time series data of a fixed length and generate time series data in terms of probability distributions for a future time window of a prediction length;
  training said customized machine learning models as said global models for said multiple related time series signals based on a periodic schedule, wherein said training process is controlled through a cost and error calculation;
  calculating an operational predictive score for each of said time series signals of said components of said information technology system as an indicator of performance of said each of said time series signals of said components of said information technology system in a near future, corresponding to said individual time series data of each of said plurality of time series signals, wherein said calculation comprises using a statistical model on said probabilistic forecast for each of said time series signals of said components of said information technology system;
  aggregating said calculated operational predictive score of each of said time series signals of said components of said information technology system into an operational predictive score for each of said components of said information technology system as an indicator of performance of said components in said near future; and
  automatically triggering retraining of said customized machine learning models based on monitoring a quality and an effectiveness of said operational predictive score of each of said time series signals and said components, wherein said monitoring said quality and said effectiveness of said operational predictive score of each of said time series signals and said components is based on factors comprising:
    missed correlation between user experience and said operational predictive score for each of said time series signals of said components of said information technology system;
    incidents without correlated operational predictive score alerts;
    low user score; and
    high forecasting error.

10. The method of claim 9, further comprising calculating a probability of said plurality of time series signals moving into an erroneous state in near future time, using said statistical model on said probabilistic forecast for each of said time series signals of said components of said information technology system, wherein said calculated probability is used to derive said operational predictive score for each of said time series signals of said components of said information technology system.

11. The method of claim 9, further comprising training a common machine learned model for a set of related times series signals.

12. The method of claim 9, further comprising monitoring a value of said operational predictive score of each of said time series signals of said components of said information technology system and a value of said operational predictive score for each of said components of said information technology system, and alerting a user when said value falls below a set threshold.

13. The method of claim 9, further comprising providing, on said graphical user interface, a visualization of said operational predictive score of each of said time series signals and said components to said user, for facilitating one or more of real-time monitoring, historical trend analysis, and system improvement.

14. The method of claim 9, further comprising calculating an operational predictive score for said services implemented using said components of said information technology system.

15. The method of claim 14, further comprising calculating said operational predictive score for said components in said services implemented using said components of said information technology system.

16. The method of claim 15, further comprising decomposing said operational predictive score for each of said components of said information technology system into a responsibility matrix when said operational predictive score for any of said components of said information technology system deteriorates during a user transaction journey within said services implemented using said components of said information technology system, to locate one or more of said components that are contributing to said deterioration.

17. A non-transitory computer readable storage medium having embodied thereon, computer program codes comprising instructions executable by at least one processor for real-time operational predictive scoring of components and services of an information technology system for forecasting and assessing performance of said components of said information technology system, the instructions when executed by the at least one processor cause the processor to perform a method comprising:
- collecting, in real-time, a plurality of time series signals comprising multiple metrics corresponding to one or more of health, performance, and functionality of each of said components of said information technology system;
- receiving a data stream comprising said collected plurality of time series signals, and storing said received data stream as individual time series data;
- generating a probabilistic forecast for each of said time series signals of said components of said information technology system collected in real-time, using a plurality of customized machine learning models comprising autoregressive Recurrent Neural Network based forecasting models, wherein said autoregressive Recurrent Neural Network based forecasting models serve as global models for multiple related time series signals and use past time series data of a fixed length and generate time series data in terms of probability distributions for a future time window of a prediction length;
- training said customized machine learning as said global models for said multiple related time series signals based on a periodic schedule, wherein said training process is controlled through a cost and error calculation;
- calculating an operational predictive score for each of said time series signals of said components of said information technology system as an indicator of performance of said each of said time series signals of said components of said information technology system in a near future, corresponding to said individual time series data of each of said plurality of time series signals, wherein said calculation comprises using a statistical model on said probabilistic forecast for each of said time series signals of said components of said information technology system;
- aggregating said calculated operational predictive score of each of said time series signals of said components of said information technology system into an operational predictive score for each of said components of said information technology system as an indicator of performance of said components in said near future; and
- automatically triggering retraining of said customized machine learning models based on monitoring a quality and an effectiveness of said operational predictive score of each of said time series signals and said components, wherein said monitoring said quality and said effectiveness of said operational predictive score of each of said time series signals and said components is based on factors comprising:
  - missed correlation between user experience and said operational predictive score for each of said time series signals of said components of said information technology system;
  - incidents without correlated operational predictive score alerts;
  - low user score; and
  - high forecasting error.

* * * * *